United States Patent [19]

Klein et al.

[11] Patent Number: 4,905,507
[45] Date of Patent: Mar. 6, 1990

[54] MULTIPLE-FUNCTION MOTION SENSOR FOR AUTOMOTIVE VEHICLE SLIP AND ATTITUDE CONTROL

[75] Inventors: Hans-Christof Klein, Hattersheim; Hubertus Von Gruenberg, Bad Homburg; Peter Lohberg, Friedrichsdorf, all of Fed. Rep. of Germany

[73] Assignee: Alfred Teves GmbH, Frankfurt am Main, Fed. Rep. of Germany

[21] Appl. No.: 326,189

[22] Filed: Mar. 20, 1989

[30] Foreign Application Priority Data

Mar. 24, 1988 [DE] Fed. Rep. of Germany ....... 3809886

[51] Int. Cl.$^4$ ............................................. G01M 19/00
[52] U.S. Cl. .................................... 73/118.1; 303/100
[58] Field of Search ................... 73/118.1, 517 R; 336/105, 110; 303/97, 100; 324/174

[56] References Cited

U.S. PATENT DOCUMENTS 4,638,289 1/1987 Zottnik ........................ 73/517 R X

FOREIGN PATENT DOCUMENTS

| | | |
|---|---|---|
| 2741883 | 12/1979 | Fed. Rep. of Germany . |
| 3007747 | 9/1981 | Fed. Rep. of Germany . |
| 3611822 | 10/1986 | Fed. Rep. of Germany . |
| 3702474 | 8/1987 | Fed. Rep. of Germany . |
| 3612170 | 10/1987 | Fed. Rep. of Germany . |
| 3624493 | 1/1988 | Fed. Rep. of Germany . |

Primary Examiner—Jerry W. Myracle
Attorney, Agent, or Firm—Robert P. Seitter

[57] ABSTRACT

A sensor for automotive vehicles with electronic control of the driving and braking behavior and/or of vibration damping in dependence on the rotational wheel speed and on the vertical acceleration of the vehicle, the sensor designed as a dual-function or multiple-function sensor by combining and structurally uniting an inductive or magnetoresistive transducer for monitoring rotational wheel velocity and a vertical acceleration sensor system for monitoring vertical vehicle body motion and, if applicable, other sensors. The measured signals are led from the sensor to signal processing circuitry via common output signal line.

17 Claims, 4 Drawing Sheets

MULTIPLE-FUNCTION MOTION SENSOR FOR AUTOMOTIVE VEHICLE SLIP AND ATTITUDE CONTROL

BACKGROUND OF THE INVENTION

The present invention relates to a sensor for automotive vehicles with electronic control of or with an electronic system influencing the vehicle's behavior, and in particular vehicles with control of the vehicle's driving and braking behavior and/or vibrational damping. Such control is applied in dependence on the rotational wheel speed and on the vertical acceleration of the wheel or of the wheel suspension, or alternatively on the acceleration of the vehicle body.

Electronic control units for different variables relating to vehicular dynamics have already found their way into automotive engineering. Electrical control of negative wheel slip prevents locking of the vehicle's wheels due to excessive braking pressure, whereby vehicle performance improves considerably during the braking operation. By means of such anti-skid systems, the driving stability and steerability of the vehicle are maintained even on extremely slippery road surfaces or in dangerous situations causing panicky braking operations.

In limiting positive wheel slip by means of electronic traction slip control systems, the start of the vehicle on a slippery road surface is rendered more easy and the driving stability is improved during accelerating operations.

Shock absorbers with an adjustable characteristic damping curve are likewise known. Also, there have already been suggestions of varying the absorber hardness automatically in dependence on kinetic quantities such as vehicular velocity, vertical acceleration and lateral acceleration of the vehicle body. Such variation would be accomplished by means of electrically controllable valves inserted into the connection lines between the working chambers of controllable hydraulic shock absorbers. A substantial improvement in vehicular braking behavior by controlling the absorber hardness is conceivable. Likewise, assisting an anti-skid system-controlled braking operation by changing the absorber hardness would lead to more effective slowing-down and to an improvement in braking comfort.

Further development of such electronic control systems and their large-scale application requires, however, that effective and cheap sensors be available for measuring control variables or for converting kinetic parameters into an electric signal which can be further processed in the logic circuits of a control unit. Parameters which are of particular interest in systems of the type described above are the rotational speed of the wheels and the vertical acceleration of the vehicle body, especially in the area of the vibration absorber.

Magnetic and magnetoresistive transducers are known for measuring wheel speed and rotational behavior. In these transducers, a toothed disk rotating along with the wheel generates an alternating signal either by magnetic induction or by causing a cyclical resistive change. Vertical vehicle body acceleration, on the other hand, can be determined by means of an inertial mass whose relative displacement with respect to a component coupled with the vehicle body is ascertained.

Thus, according to the prior art, a plurality of sensors is required at each wheel. The manufacturing costs, as well as expenses for installation and adjusting of the sensors and related equipment such as connection cables, are therefore rather high. Another disadvantage is the excessive space required for a plurality of sensors, especially since in practice there are but a few points on the wheel suspension that are deemed ideal or even suitable for placing the sensors.

It is thus a general object of this invention to overcome the described disadvantages and to considerably reduce the required manufacturing expenditure and efforts. The reliability of the sensors should to be increased or at least maintained.

SUMMARY OF THE INVENTION

It now has been found that this object can be achieved by developing an improved sensor of the type referred to above, in which the sensor is designed as a dual-function or multiple-function sensor which combines and structurally unites two or more transducer systems. In particular, the inventive sensor consists of both a rotary wheel motion sensor system—consisting of an inductive or magnetoresistive transducer which is arranged on the vehicle body near the periphery of a toothed disk rotating along with the wheel—and a vertical acceleration sensor system.

On the one hand, by combining and structurally uniting the transducer systems, a considerable reduction in the manufacturing and assembly expenditure is achieved and, on the other hand, it becomes possible to place the combined transducer system in the very spot of the wheel suspension which is considered optimal for measuring. The space required for installation of the sensor system becomes small.

According to an advantageous embodiment of this invention, the transducer systems are arranged in a common sensor housing and are connectible to a control unit or other signal processing means via a common signal line, i.e., a multi-conductor line, a coaxial line or the like. The connection with the control unit is expediently effected via a common plug.

Additionally, it is possible to arrange electronic circuits within the sensor housing for handling, amplifying and/or processing the signals of one or more of the transducer systems therein.

According to this invention, it is also provided to design and arrange certain components of the transducer systems such as to enable them to perform double or multiple functions in the signal converting and/or signal processing operations.

According to a further advantageous embodiment of this invention, the vertical acceleration sensor system of the inventive sensor has an inertial mass whose change in position relative to a component or measuring element affixed to the sensor housing can be used to determine vertical displacement of the vehicle body. The output signal of such a component can be generated by means of a piezoelectric, inductive, resistive or magnetoresistive measuring device which may include an adjustable oscillatory circuit for frequency modulation of a high-frequency oscillating signal or the like.

In one such embodiment of this invention, the inductive transducer (when mounted) consists of an upright or nearly upright coil having a core which simultaneously serves as an abutment for a plate of piezoelectric material. In this particular embodiment, inertial mass of the vertical acceleration sensor system rests on and can elastically be pressed against the piezoelectric plate, e.g., by embedding the inert mass in a rubber block within the sensor housing.

In another especially simple embodiment of the invention, the sensor essentially consists of a coil which, on the side facing the toothed disk, has a permanent magnet core and a speed measuring winding for measurement of wheel rotational behavior. A second sensor system is provided which is coaxial with and above the core, and has an inertial mass elastically embedded in the vertical direction and having measuring winding for monitoring of vertical acceleration.

In order to realize a resistive measuring system, the inertial mass of the acceleration sensor system can be embedded in a holding device or in molds of conductive rubber whose internal resistance depends on the action of pressure or force exerted by the inertial mass. An electrical signal dependent in this internal resistance is then evaluated for determining the vertical acceleration.

Alternatively, one sensor according to the invention is designed so that the acceleration sensor system has an upright or inclined coil whose core is composed of one or of a plurality of permanent magnets stationarily arranged in the sensor housing. At least one permanent magnet is floatingly held by magnetic force above the stationary permanent magnet or between two stationary permanent magnets, and serves as an inertial mass for determining the vehicle's vertical acceleration, said coil carrying at least one measuring winding.

Finally, according to this invention, it is possible to design the sensor as a dual-function sensor essentially consisting of an upright or inclined coil whose core is composed of a plurality of permanent magnets arranged on one axis. Of these permanent magnets at least one magnet is floatingly held by magnetic force either between stationary permanent magnets or on top of one permanent magnet, with the coil having windings for detecting both the rotational wheel speed and for determining the vertical acceleration.

It is also possible to use bodies of magnetoresistive material, the resistivities of which change in response to variations in magnetic field strength, instead of using measuring windings.

BRIEF DESCRIPTION OF THE DRAWINGS

Any further characteristics, advantages and applications of the invention will become evident from the following description of examples of embodiments, reference being made to the accompanying Figures in which.

DETAILED DESCRIPTION OF THE PREFERRED EMBODIMENTS

Figure 1:
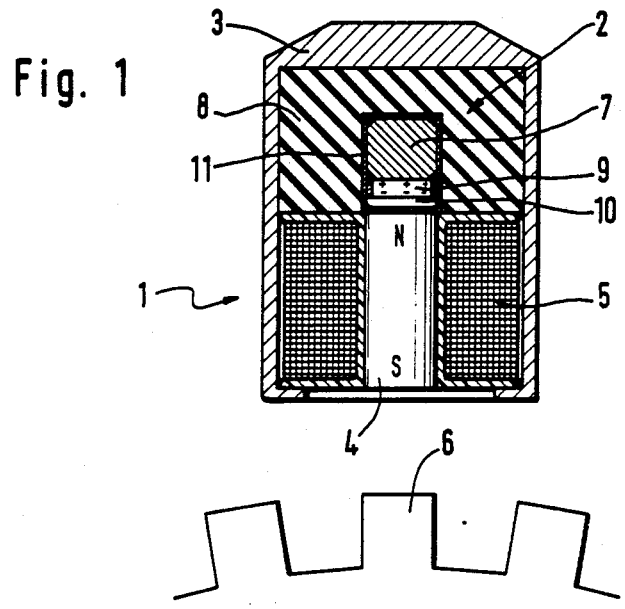
FIG. 1 is a sensor with a piezoelectric vertical acceleration measuring device.

In the embodiment of FIG. 1, a dual-function sensor according to this invention is composed of an inductive transducer 1 for measuring rotational wheel speed and of a sensor system 2 for measuring vertical acceleration. The two transducer systems are combined and structurally united in one sensor housing 3.

The inductive transducer 1 of the dual-function sensor shown in FIG. 1 consists of a coil with a coil core 4 and of a measuring winding 5. When the sensor 1 is mounted to an automotive vehicle, said coil will stand upright or will be slightly inclined. The sensor of FIG. 1 is mounted directly beyond the periphery of a toothed disk 6 firmly connected to the wheel the rotational behavior of which is to be determined, said toothed disk 6 thus rotating along with said wheel. A permanent magnet serves as core 4. As soon as the toothed disk 6 rotates, which disk consists of magnetically conductive material, an alternating voltage will be induced in the measuring winding 5. The frequency and changes in frequency of the alternating voltage will represent the rotational behavior of the wheel, in this case an automotive vehicle's wheel, which is connected with the toothed disk 6.

The core 4 of the coil simultaneously serves as an abutment for an inertial mass 7 of the acceleration sensor system. Said inertial mass 7 is pressed against the surface of a plate 9 of piezoelectric material by the elasticity of a rubber block 8 within the sensor housing 3. The piezoelectric plate 9 is itself supported on the core 4 via a support plate 10 laminated on both sides. In this embodiment, a brass block serves as an inertial mass 7. Together with the piezoelectric plate 9 and the support plate 10, said brass block is surrounded by a very thin brass foil 11. Said foil 11 surrounds the brass block 7 and the lower conductive lamination of the support plate 10, yet has no electrical contact with the lateral edges of the piezoelectric plate 9 or with conductive top surface of plate 10. This is achieved by the selective application of an insulative rubber coating. In this manner, a shielded system comparable to a coaxial system is formed which, due to the protective action of the foil 11, is largely protected from electrical interference. The measured signal is conducted outwards between the top surface of the support plate 10 and the foil 11. The inertial mass 7 is thus supported on the magnet core 4 via the piezoelectric plate 9.

Referring now to the position of the sensor 1 shown in FIG. 1, the sensor is fastened vertically at the wheel suspension, or alternatively near the wheel, to the body of an automotive vehicle. To this end, the sensor housing 3 is rigidly connected with the component whose vertical acceleration is to be measured. Due to the vibrations or vertical acceleration of the vehicle body, the inertial mass 7 is vertically displaced relative to the housing 3 and the vehicle body and is caused to oscillate since the mass 7 is elastically embedded in the rubber block 8. This inertial mass 7 is also biased downwardly and, via the piezoelectric plate 9 and the plate 10, is resiliently pressed against the abutment formed by the core 4. Therefore, an electric signal may be picked up from the piezoelectric plate 9, said signal corresponding to the vertical acceleration or vertical oscillation of the mass 7.

For the sake of clarity, the electrical connection lines for the two transducer systems 1, 2 of FIG. 1 are not illustrated. The signals generated can be led out of the sensor via a common coaxial cable or via a multiple conductor line, e.g., via a two-core, three-core or four-core line, and can be connected to the associated electronic system via a common plug.

Figure 2:
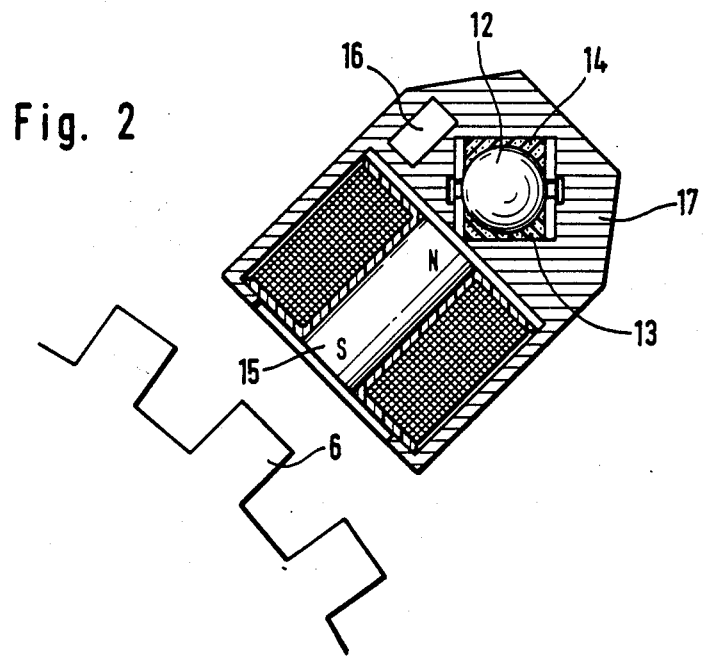
FIG. 2 is a sensor with a resistive vertical acceleration measuring device.

The embodiment of the invention shown in FIG. 2 differs from that of FIG. 1 primarily in the way that vertical acceleration and oscillation of the inertial mass is converted into an electric signal. In accordance with FIG. 2, a glass ball 12 is provided as an inertial mass embedded in two mold halves 13, 14 of conductive rubber. The internal resistance of such rubber depends on the pressure exerted on the material. Therefore, with reference to the direction of the vertical acceleration to be measured, an upper mold half 14 and a lower mold half 13 are used for embedding the ball 12. The internal resistances of said mold halves are changed in an opposite manner upon the appearance of a vertical acceleration since, in the case of pressurization of either mold half, the other will be relieved of pressure and vice versa. The arrangement of the molds, or rather of the mold halves 13, 14, depends on the orientation or angle of installation of the dual-function sensor. The sensor illustrated in FIG. 2 is adapted for being mounted on a vehicle body at an angle of about 45 degrees. The molds themselves are supported on the core 15 of the inductive transducer of the sensor.

In FIG. 2, the sensor housing 17 furthermore houses an electronic circuit 16 for handling, amplifying and/or processing the signals of the acceleration sensor system or of the two sensor systems. The signal lines leading outside of the sensor have not been illustrated in FIG. 2.

Figure 3:
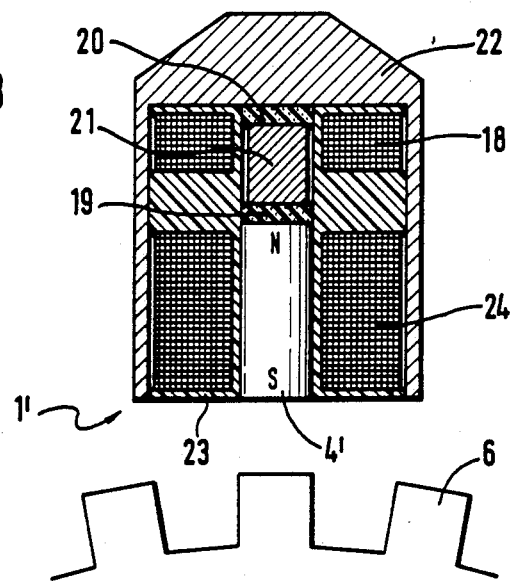
FIG. 3 is a sensor having a measuring device essentially consisting of a coil.

A further embodiment of the present invention, as shown in FIG. 3, has a measuring winding 18 for measuring the vertical acceleration. In measuring winding 18, a signal will be induced as soon as an inertial mass 21, here a steel mass vertically displaceably supported between rubber springs 19 and 20, moves relative to the sensor housing 22. The transducer system 1' for determining the wheel speed is the same as the transducer system 1 as per FIG. 1.

The sensor of FIG. 3 has an especially simple design. Essentially, it consists only of an upright coil or coil form 23 with a speed measuring winding 24 and an acceleration measuring winding 18, a permanent magnet core 4' and the steel mass 21 likewise arranged in the core of the coil. The inertial steel mass 21 which is held by the rubber springs 19 and 20 is positioned between the stationary permanent magnet 4', which is glued to the inside of coil 23, and the sensor housing 22.

Upon an oscillation of the inert mass 21 due to vertical acceleration of the vehicle body, a signal will, admittedly, be induced in both measuring coils 18 and 24. Said signal can, however, be separated electronically from the rotational speed signal produced in the speed measuring winding 24.

Figure 4:
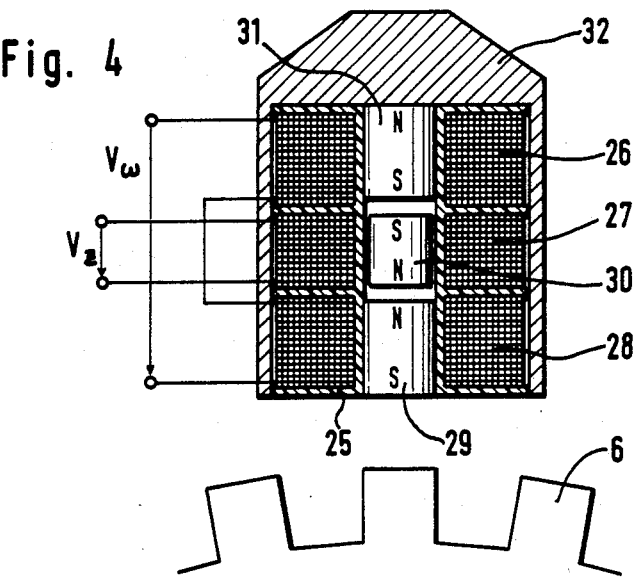
FIG. 4 is a sensor with permanent magnets floatingly held by magnetic force.

FIG. 4 shows yet another embodiment of the inventive dualfunction sensor, again consisting essentially only of an upright coil with a plurality of windings 26, 27, 28 and of a multiple-part core 29, 30, 31 in the internal tube of the coil form. The core is composed of three permanent magnets 29, 30, 31 arranged on one axis, one on top of the other. Of the three magnets, the two outer ones 29, 31 are permanently fixed relative to the sensor housing by way of being glued into the coil tube, while the middle permanent magnet 30 "floats" between the two magnets 29, 31. The middle permanent magnet 30 is held in this position by magnetic force, namely by the repulsive forces of like magnetic poles.

The outer windings 26, 28 of the coil 25 are connected in series, while winding 27 is separate. The mechanical oscillation properties of the acceleration sensor system can be adjusted by varying the mass of the middle magnet 30, the magnetic repulsive forces of the respective magnets and the friction in the coil form 25. A reduction in the distance between the magnets 29 and 31 will increase the resilient action. The mass of the middle magnet 30 will likewise have an influence on the performance of the acceleration measuring system.

The arrangement of the coil and of the permanent magnet as per FIG. 4 has several advantages. In the case of a vertical vibration of the vehicle body and, hence, of the sensor housing 32, the floatingly-positioned permanent magnet 30 will be caused to oscillate. The magnet flux will thereby be increased (or diminished) between the magnets 29 and 30 on the one hand, and decreased (or increased) between the magnets 30 and 31 on the other hand, in phase opposition. The voltages induced in the windings 26 and 28 due to the vibrations of the vehicle body therefore will largely cancel each other because of the series connection of these two windings. Only in the middle winding 27 will a measurable signal be induced which accurately reflects vertical vehicle body acceleration.

In contrast, a rotary motion of the toothed disk 6 will lead to synchronously phased and therefore additive voltages in the windings 28 and 26. The rotary motion will generate a signal primarily in the winding 28 arranged nearest the periphery of the disk 6. Therefore, it is possible to clearly separate the measured rotational speed signal from the measured vertical acceleration signal.

It is also possible to arrange the winding 27 as a high-frequency coil of an oscillatory circuit. In this case, the coil will react not to the change of the static magnetic field, but to changes in inductance accompanying a displacement of the magnetically positioned permanent magnet 30. Expediently, in this case, the coil 27 is arranged relative to the permanent magnet 30 so as to ensure that the oscillating body 30 will more or less move in and out of the coil. The change in frequency of the oscillatory circuit in this case is an indication of the vertical acceleration to be measured.

Figure 5:
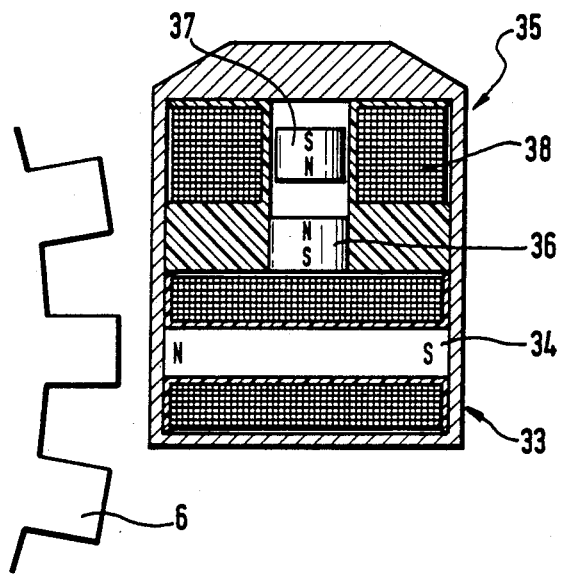
FIG. 5 is a sensor with rotational speed and vertical acceleration measuring coils arranged perpendicularly with respect to each other.
Figure 6:
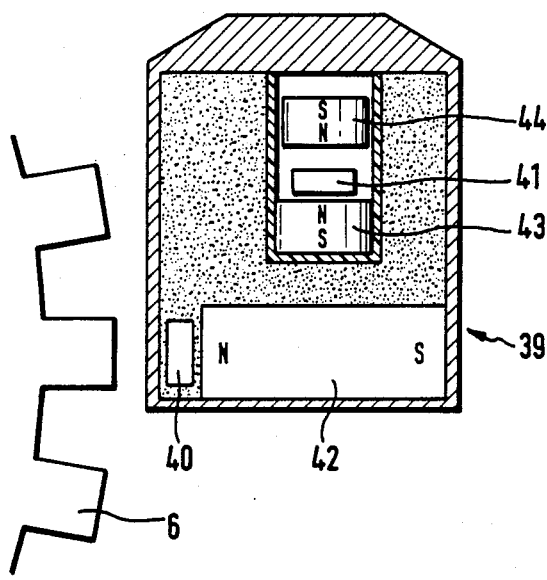
FIG. 6 is a sensor with a magnetoresistive transducer.

The examples of embodiments as per FIGS. 5 and 6 differ from the sensors described above in the arrangement of the speed measuring systems 33, 39, which are turned by 90 degrees. A vertical acceleration sensor system 35 is arranged upright in the neutral zone of the permanent magnet 34. Said vertical acceleration sensor system 35 essentially consists of a stationary permanent magnet 36, a permanent magnet 37 floatingly held above the stationary magnet 36 by the magnetic repulsion reaction of like magnetic poles, and a measuring winding 38. The sensor of FIG. 5 must be fastened upright or at least at no more than a minor inclination on the vehicle body in order for the magnetic forces and the force of gravity to keep the magnet 37 in its position.

In order to adjust the oscillation characteristics of the inventive sensor of FIG. 5, it might be possible to arrange a further stationary permanent magnet on top of the magnet 37. Such an arrangement would be comparable to the example of an embodiment of FIG. 4.

FIG. 6 illustrates a sensor of the inventive type where both the rotational speed signal and the vertical acceleration signal are obtained by means of a magnetoresistive sensor or body 40 or 41, respectively.

The reference resistivity of the magnetoresistive bodies 40 and 41 is determined by the positioning and field strength of permanent magnets 42 and 43/44, respectively. Rotary motion of the toothed disk 6 will lead to a cyclical change in the magnetic field and, hence, in the internal resistance of the body 40. In case of a vertical acceleration or vibration of the vehicle body, the change in position of the floatingly-positioned permanent magnet 44 will change the magnetic field in the vicinity of the body 41, thereby modulating the internal resistance of the body and producing a measured signal. For the sake of clarity, the electrical connection wires and circuit configurations for handling and processing the signals generated by the magnetoresistive bodies 40 and 41 are not illustrated in FIG. 6.

Figure 7:
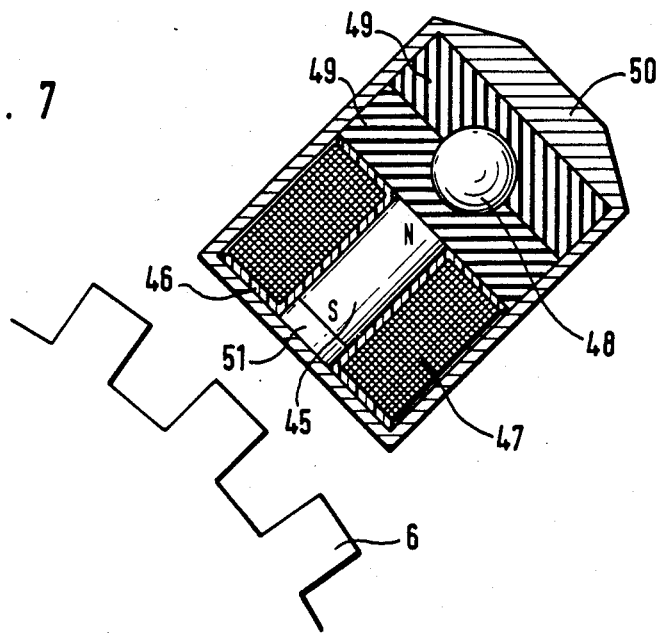
FIG. 7 is a further example of an embodiment comprising a sensor with a magnetoresistive transducer and having an elastically embedded mass, the motion of which is transmissible to a permanent magnet.

In FIG. 7 an alternative embodiment of the inventive dual-function sensor is illustrated wherein a magnetoresistive transducer 51 is provided for rotational wheel speed determination. A permanent magnet 45 biases the magnetoresistive body 51 towards a particular reference resistivity. A rotation of the toothed disk 6 relative to the illustrated sensor will lead to a change in the magnetic field and, hence, to a change in the internal resistance of the magnetoresistive body 51.

The permanent magnet 45 is arranged in the core range of a coil 46 with a winding 47. In conjunction with the action of an inertial mass or steel ball 48 arranged in molded rubber parts 49 within the sensor housing 50, the magnet 45 and the winding 47 form a second sensor system for measuring the vertical acceleration of the vehicle body. By means of the choice of the rubber used in molded parts 49, or, e.g., of the clamping forces used during assembly of the sensor, it is possible to adjust the damping and resilient effects acting on the mass and, thus, the characteristic curve of the vertical acceleration system and to adapt them to the requirements of the planned application.

Figure 8:
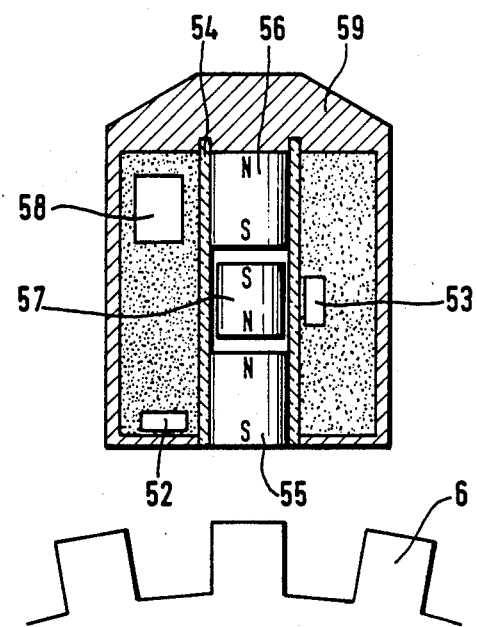
FIG. 8 is a design similar to that of the sensor shown in FIG. 4, with, however, magnetoresistive measuring devices.

Finally, in FIG. 8, another sensor is illustrated which in terms of design resembles the sensor of FIG. 4 to a high degree. Instead of using the measuring windings used in the earlier embodiment, the sensor shown in FIG. 8 includes magnetoresistive bodies 52 and 53 for measuring the magnetic field changes indicative of rotational wheel speed (body 52) and of vertical acceleration of the vehicle body (body 53). Within a glass or other non-magnetic tube 54, there are again two stationary permanent magnets 55, 56 and a permanent magnet 57 magnetically positioned between them.

An electronic circuit means 58 is likewise integrated in the sensor housing 59. The measured signals of the magnetoresistive bodies 52, 53 will be fed to the circuit means 58 via non-illustrated lines. In circuit means 58, they will be processed and amplified. The supply voltage for the measuring bodies 52, 53 will likewise be supplied via said circuit means 58 and will be stabilized thereby. For the sake of clarity, the signal line via which the measured signals are jointly led out of the sensor is not illustrated in FIG. 8.

All the embodiments described above are characterized by a simple design and by far-reaching possibilities of variation. It is possible in accordance with the invention to realize both sensitive transducer systems as well as transducer systems which will not emit a measured signal until relatively high threshold values have been surpassed. It is further envisioned that these and other variations may be undertaken without departing from the scope of the present invention as claimed herein.

What is claimed is:

1. A multiple-function sensor for use in an automotive vehicle equipped with electronic control of said vehicle's behavior, and in particular control of driving and braking behavior and of vibrational damping, in dependence on a rotational velocity of at least one wheel and on a vertical acceleration of a portion of said vehicle's body, wherein said sensor comprises a multiple-function sensor combining and structurally uniting at least two transducer systems, the transducer systems comprising a rotational wheel velocity sensor system in which an inductive transducer is arranged on the vehicle body near the periphery of a toothed disk attached to the wheel, the disk rotating along with the wheel, the transducer delivering an electric signal representative of the rotary motion of the wheel, and said transducer systems further comprising a vertical vehicle body acceleration sensor system.

2. The sensor claimed in claim 1, wherein the transducer systems are arranged in a common sensor housing and are connectible to signal processing means via a common signal line.

3. The sensor claimed in claim 2, wherein electronic circuits are arranged within the sensor housing for handling, amplifying and processing the signals of at least one transducer system.

4. The sensor claimed in claim 3, wherein at least one component of the transducer systems performs multiple functions in signal generating and signal processing operations.

5. The sensor claimed in claim 4, wherein the vertical acceleration sensor system has an inertial mass whose change in position relative to a measuring element coupled with the sensor housing can be determined by means of a piezoelectric measuring device.

6. The sensor claimed in claim 5, wherein said inductive transducer, when mounted, comprises a substantially upright coil with a core simultaneously serving as an abutment for a plate of piezoelectric material on which the inertial mass of the vertical acceleration sensor system rests and against which the inertial mass is elastically pressed.

7. The sensor claimed in claim 6, wherein the inertial mass of the vertical acceleration sensor system is elastically held against the piezoelectric plate by being embedded in a rubber block inside the sensor housing.

8. The sensor claimed in claim 5, wherein a coil which, on the side facing the toothed disk, has a permanent magnet core and a speed measuring winding and which, above the core, has an inertial mass elastically embedded in a manner allowing movement in the vertical direction and having an acceleration measuring winding.

9. The sensor claimed in claim 5, wherein the inertial mass of the vertical acceleration sensor system is embedded in a holding device of conductive rubber whose internal resistance depends on a compressive force exerted by the inertial mass, said resistance being evaluatable for determining the vertical acceleration.

10. The sensor claimed in claim 5, wherein the vertical acceleration sensor system comprises a substantially upright coil whose core is composed of at least one permanent magnet stationarily arranged in the sensor housing and of at least one permanent magnet floatingly held by magnetic force away from at least one stationary permanent magnet and serving as inertial mass for determining the vertical acceleration, said coil including at least one measuring winding.

11. The sensor claimed in claim 5, wherein the sensor is designed as a dual-function sensor and comprises a substantially upright coil whose core is composed of a plurality of permanent magnets arranged on one axis, one on top of the other, of which permanent magnets at least one movable permanent magnet is floatingly held by magnetic force away from at least one stationary permanent magnet, the coil having windings both for detecting the rotational wheel speed and for determining the vertical vehicle body acceleration.

12. The sensor claimed in claim 5, wherein the sensor is designed as a dual-function sensor and comprises a substantially upright tube wherein a plurality of permanent magnets are arranged, one on top of the other, of which permanent magnets at least one permanent magnet is floatingly held by magnetic force away from at least one stationary permanent magnet, and further comprises, outside the tube, bodies of magnetoresistive material for detecting the rotational wheel speed as well as for determining the vertical vehicle body acceleration.

13. The sensor claimed in claim 4, wherein the change in position of the inertial mass is determined by means of an inductive measuring device.

14. The sensor claimed in claim 4, wherein the change in position of the inertial mass is determined by means of a resistive measuring device.

15. The sensor claimed in claim 4, wherein the change in position of the inertial mass is determined by means of a magnetoresistive device.

16. The sensor claimed in claim 4, wherein the change in position of the inertial mass is determined by means of a measuring device having a modulatable oscillatory circuit.

17. The sensor claimed in claim 1, wherein the rotational wheel velocity sensor system includes a magnetoresistive transducer.

* * * * *